(12) United States Patent
Breeden et al.

(10) Patent No.: US 7,526,537 B2
(45) Date of Patent: Apr. 28, 2009

(54) EXTENDING AN ORIGINAL CONFIGURATION OF A PORTAL USING PORTAL EXTENSIONS

(75) Inventors: Timothy Breeden, Boulder, CO (US); Skip Sauls, Longmont, CO (US); Chris Jolley, Broomfield, CO (US)

(73) Assignee: Bea Systems, Inc., Redwood Shores, CA (US)

( * ) Notice: Subject to any disclaimer, the term of this patent is extended or adjusted under 35 U.S.C. 154(b) by 479 days.

(21) Appl. No.: 11/132,033

(22) Filed: May 18, 2005

(65) Prior Publication Data

US 2006/0036734 A1    Feb. 16, 2006

Related U.S. Application Data

(60) Provisional application No. 60/573,269, filed on May 21, 2004.

(51) Int. Cl.
*G06F 15/16* (2006.01)

(52) U.S. Cl. ....................................................... 709/220
(58) Field of Classification Search ................... 707/1, 707/10, 101, 102, 204, 205; 709/217–219, 709/220
See application file for complete search history.

(56) References Cited

U.S. PATENT DOCUMENTS

| 6,070,008 | A | * | 5/2000 | Korenshtein | 717/122 |
| 2004/0205473 | A1 | * | 10/2004 | Fisher et al. | 715/500 |
| 2005/0065913 | A1 | * | 3/2005 | Lillie et al. | 707/3 |
| 2005/0240798 | A1 | * | 10/2005 | Benedek et al. | 714/4 |

* cited by examiner

*Primary Examiner*—Jeffrey Pwu
*Assistant Examiner*—Scott M Sciacca
(74) *Attorney, Agent, or Firm*—Fliesler Meyer LLP

(57) ABSTRACT

A portal includes an original configuration and extension. The original configuration can include resources and a portal file identifying the resources. The extension modifies the original portal to form an extended portal without changing the original configuration.

19 Claims, 7 Drawing Sheets

FIG. 2

EXTENDING AN ORIGINAL CONFIGURATION OF A PORTAL USING PORTAL EXTENSIONS

CLAIM OF PRIORITY

This application claims priority to U.S. Provisional Application No. 60/573,269 entitled "Portal Extensions" filed May 21, 2004.

BRIEF DESCRIPTION OF THE DRAWINGS

FIG. 2 is a diagram that illustrates a display of a system administration console in one embodiment of the present invention.

DETAILED DESCRIPTION

Figure 1:
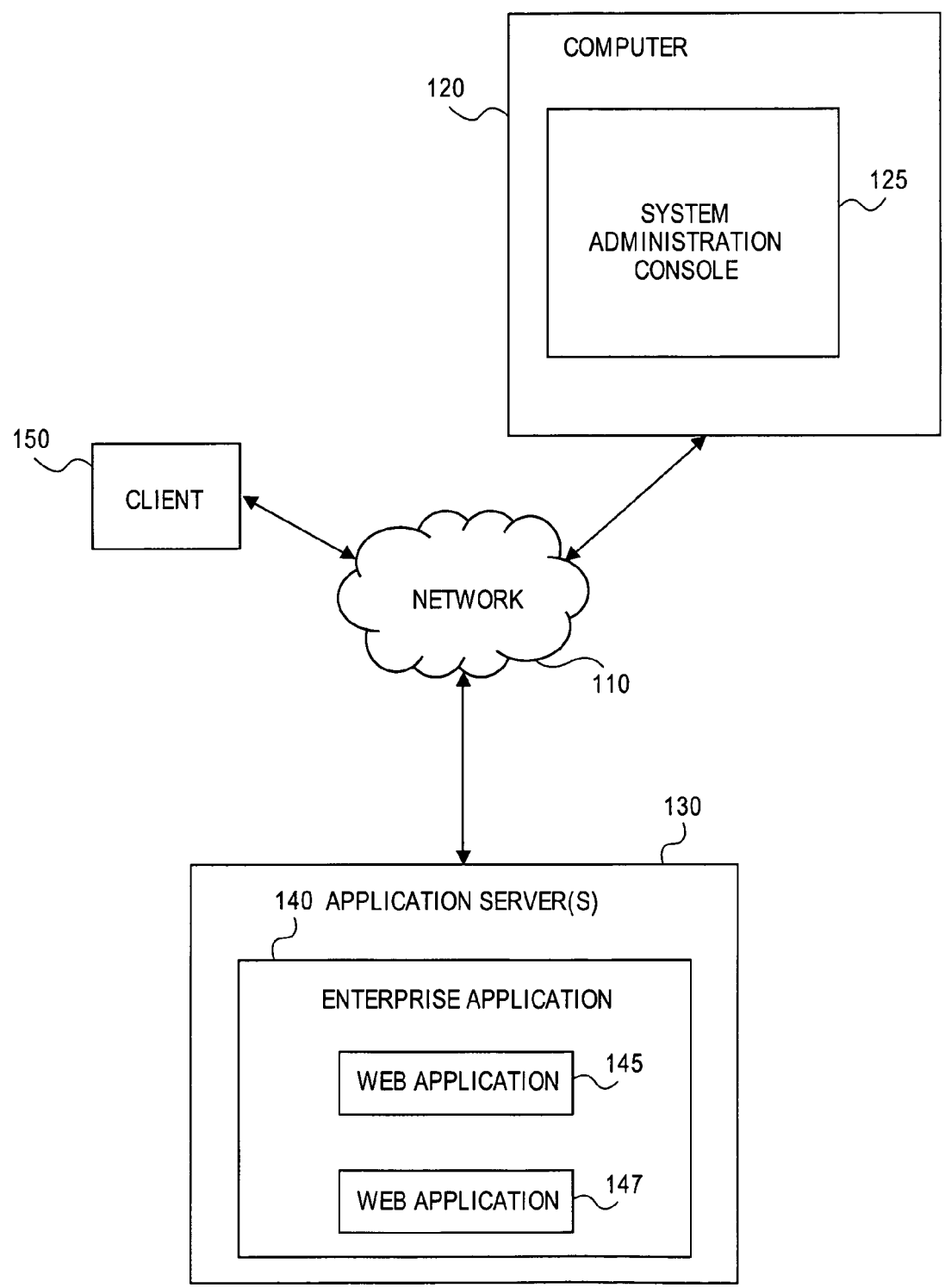
FIG. 1 is a diagram that illustrates a system including application servers and a system administration console.

FIG. 1 illustrates a system of one embodiment of the present invention including a system administration console 125. In this example, the system administration console is an system administration tool that can allow the installation, configuration, monitoring and management of application server resources. In the example of FIG. 1, application server or servers 130 run an enterprise application 140. The application server(s) can be software such as a WebLogic Server™ installation or installations. WebLogic Server™ is available from BEA Systems of San Jose, Calif. In one embodiment, the system administration system console 125 can be used to manage and monitor application hosted on the enterprise application 140, such as web applications 145 and 147. The enterprise application 140 can consist of one or more enterprise application insistences hosted on one or more physical machines.

In one embodiment, a domain is a logically related group of application resources that are managed as a unit by an administration server and with the system administration console. The domain can include one or more application server instances or clusters. A client 150 can access the web applications administered by the system administration console across the network 110.

In one embodiment, the system administration uses the JAVA Management Extension (JMX) specification. The JMX API models system and administration functions with JAVA objects called MBeans. MBeans used to manage an enterprise application 140 can include administration, configuration, and runtime MBeans. Administration MBeans contain a set of attributes that define configuration parameters for management functions. In one embodiment, a config.xml file is located at a machine hosting an administration server, which provides persistent storage of MBean attribute values. Whenever an attribute is changed using the system administrator console 125, the values can be stored in the appropriate administration MBean and written to the config.xml file. Configuration MBeans are copies of the administration MBeans that the other servers use to initialize their configuration. Runtime MBeans are attributes consisting of runtime information for active application servers and instances in applications.

In one embodiment, the system administration console 125 is hosted by an administration server. In one embodiment, the administration console can be accessed using a web browser from a machine on a local network, which can communicate with the administration server. In one embodiment, the system administration console can have management capability over application server instances, clusters and applications, including capability such as configuration, stopping and starting application servers, monitoring server health and performance, monitoring application performance, viewing server logs, editing deployment descriptions for web applications, Enterprise JAVA Beans (EJBs), J2EE connectors, and enterprise applications. The system administration console 125 in one embodiment allows users to do management tasks without interfacing with JMX APIs or the underlying management architecture.

In one embodiment, security for the system administration console is done based upon a number of user roles. Users in an administrator role can have exhaustive control over the administration servers through the administration console. Users in an operator role can start and stop administration servers in clusters. Users in a deployment role can operate on applications. Users in a monitor role can read out the information about the operation of the servers and applications.

Figure 2:
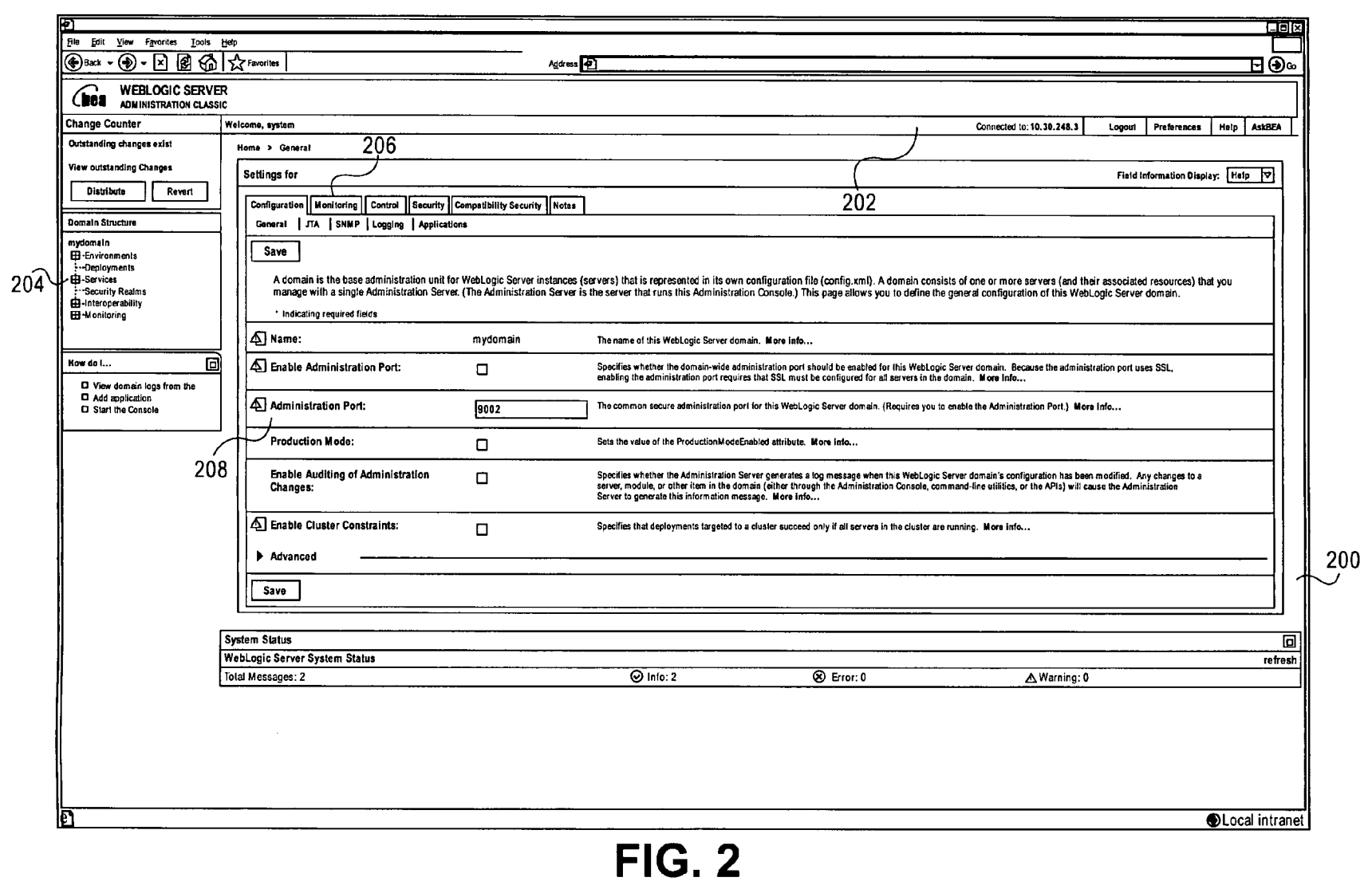

FIG. 2 illustrates a diagram of a system administration console 200. In one example, the banner area 202 shows the name and configurations of the monitored object currently displayed in the console, shows the host name or IP address of the administration server, shows the user name used to log in to the console, shows links to the logout of the console, shows an icon to display the console home page, shows an icon to get help on the console operations, and shows an icon to display the contents of the right panel of the console. The left panel in the administration console shows a navigation tree used to navigate the console pages. After left-clicking the nodes 204, console pages related to the nodes will be displayed in the right panel of the console. Nodes proceeded by a plus sign can be expanded to access additional resources. In the example shown here, there is a tabbed interfaced in the right panel with tabs 206. The tabs 206 allow access to additional displays. This example shows attributes 208 which include a field which can be used to change the administration port.

Figure 3A:
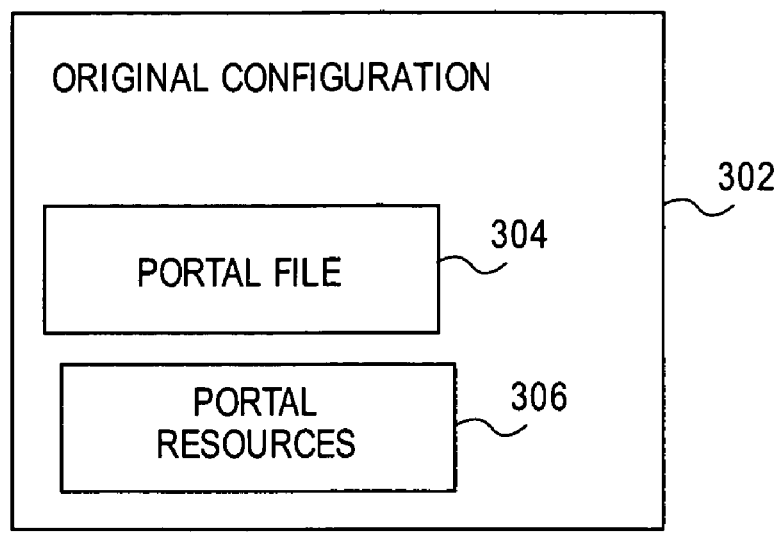
FIG. 3A is an illustration of construction of an original portal or original administration console for an original configuration.
Figure 3A:
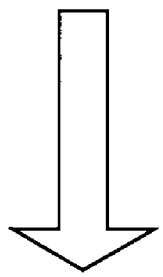
Figure 3A:
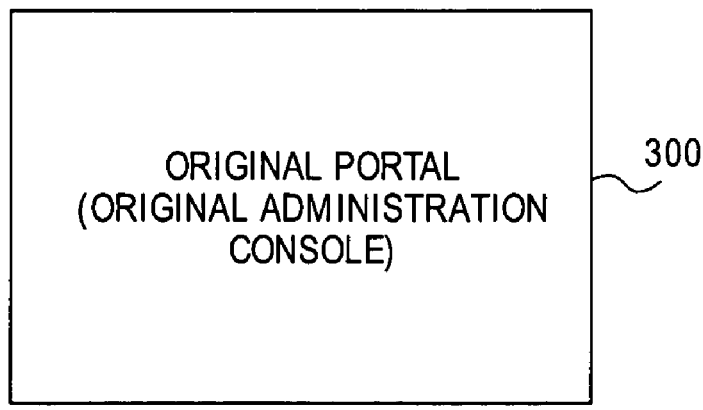

FIG. 3A illustrates the construction of a portal such an original administration portal 300 from an original configuration 302. In this example, the original configuration includes a portal file 304 and portal resources 306. In one embodiment, the portal file indicates which portal resources are used to construct the portal. The construction of a portal can be done by using a portal project, such as a WebLogic Portal™ available from BEA Systems, Inc. of San Jose, Calif. In one embodiment, the portal file 304 is an XML file, which indicates the arrangement of the portal resources 306 for use in the portal. The portal once constructed can be deployed using an application server such as WebLogic Server™. The portal resources can include any type of resources including desktops, menus, pages, look and feel elements, portlets, images, controls and the like.

Figure 3B:
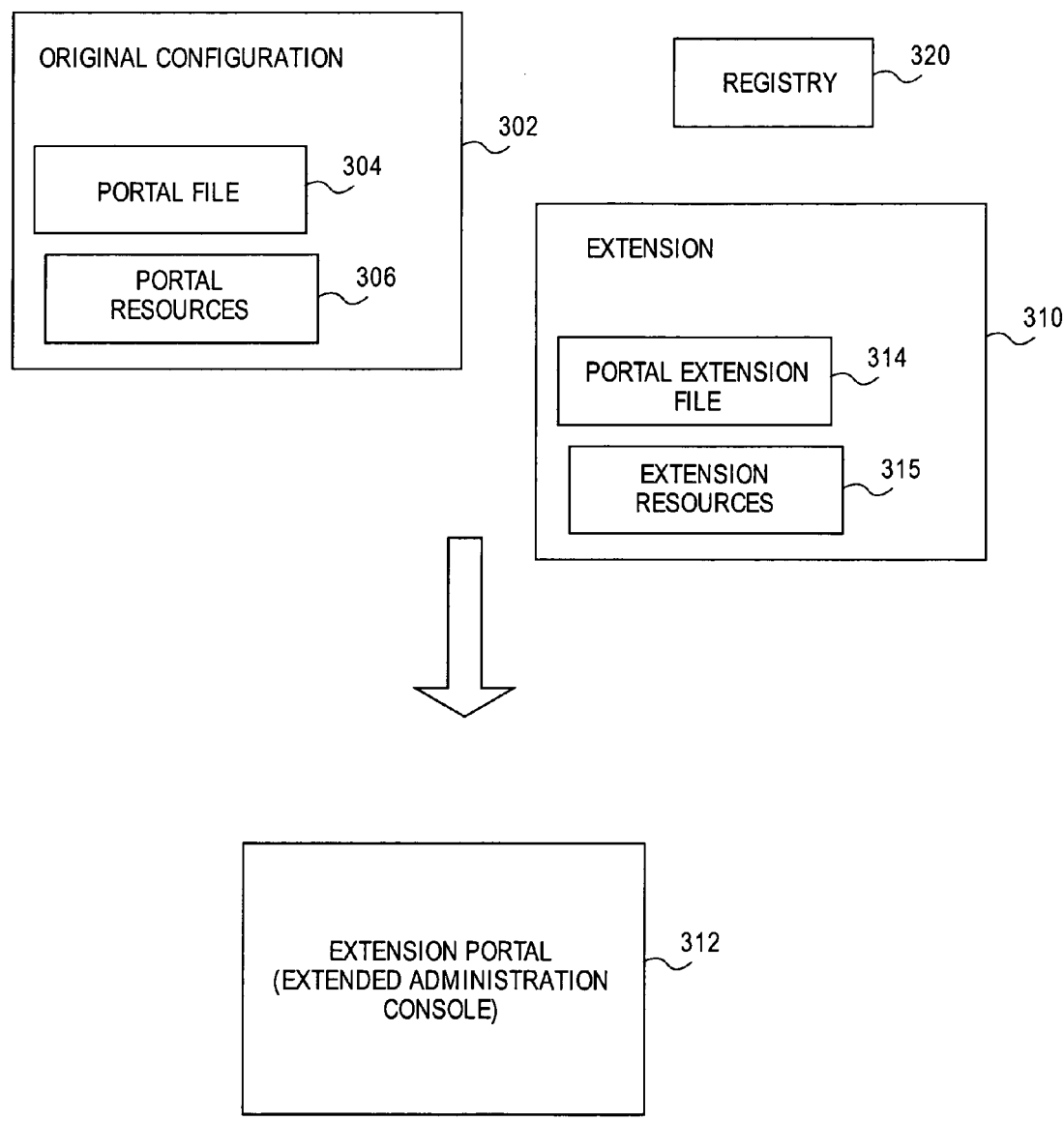
FIG. 3B illustrates the construction of an extended portal or an extended administration console from an original configuration and an extension.

FIG. 3B illustrates the use of the extensions in the system in the present invention. In one embodiment, the original configuration 302 is extended by using an extension 310. The extension 310 is used along with the original configuration 302 to produce an extended portal 312. In one embodiment, the extension includes a portal extension file 314 and extension resources 316. In one embodiment, the extended portal or extended administration console 312 is constructed from the original configuration 302 and the extension 310. The extended portal 312 can be created without changing the original configuration 302. In one embodiment, a registry 320 points to each of the extensions and indicates the order that these extensions are to be loaded. Extension 310 includes a portal extension file 314 that indicates the position that the extension resources 316 and to be added into the extended portal or extended administration console. In one embodiment, a temporary file, the portal extension file 314 indicates how the portal 304 is to be updated to indicate the extended portal file, now shown, which can be temporarily stored. This extended portal file can indicate the portal resources 306 as well as the extension resources 316.

In one embodiment, a single sign on (SSO) process can be done for portals derived from the original configuration and the extended portals. This allows for the loading for the extensions after sign-in without requiring an additional sign-on.

The original configuration 302 can be stored in an archive file. In one embodiment, the extension does not change the contents of the archive file. In one embodiment, the system administration console 312 is implemneted as a portal.

In one embodiment, the system administration console 312 is constructed with a portal product, such as the WebLogic Portal project.

In one embodiment, the portal extension file 314 indicates the insertions of a portal element or extension resource in a certain position within the extended portal or extended administration console. The resource can be removed from the portal or replaced by an extension resource as indicated by the portal extension file. In one embodiment, the portal extension file includes instructions, insert, append, replace, and remove, which can indicate the operations on to the regional operations to modify the extended portal (extended administration console). The extension 310 can be stored in a different folder than the original configuration. In one embodiment, the folder indicates the source of the extension.

The extension can change the look and feel of the system administration of the extended portal or extended administration console. For example, the extension can include a new look and feel document for all or part of the portal or administration console 312. In one embodiment, the extension 310 modifies functionality of the portal or administration console. In another embodiment, the extension replaces functionality of the portal or administration console.

Figure 3C:
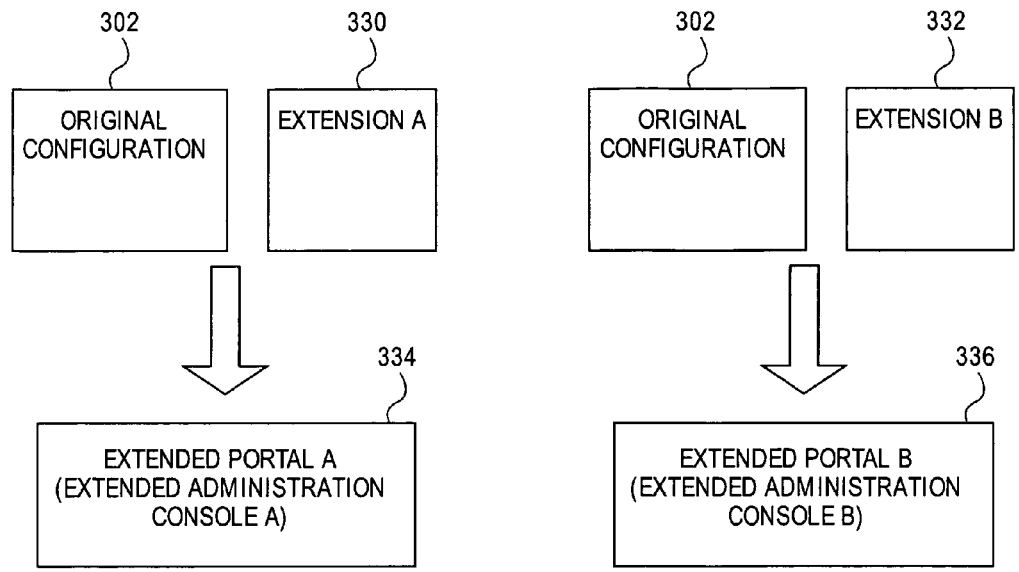
FIGS. 3C and 3D illustrate advantages of the use of the extensions in one embodiment of the present invention.
Figure 3D:
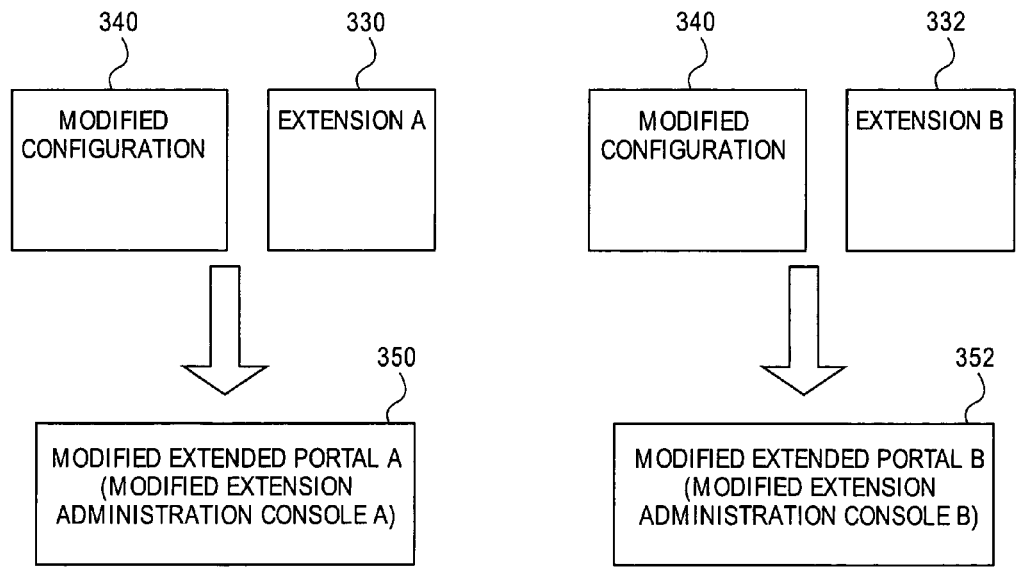

FIG. 3C illustrates a benefit of using the extensions of the present invention. In FIG. 3C, the original configuration 203 can be used along with extensions 330 and 332. This allows the construction of two extended portals 334 and 336. Later when the original configuration is modified, this modified configuration 340 can be provided to a number of different users, including the users of extension A and extension B. By combining the modified configuration 340 with extension 330 and extension 332, modified extended portals 350 and 352 can be constructed without requiring separate modification to a large number of portal files. This is especially important when a large number of users will have a large number of different extensions. This means that only single original configuration needs to be controlled and maintained by a central company or consultant. This modified configuration can then be combined with the variety of different extensions developed by the individual companies or people. The compatibility of the modified configuration 340 with the different extensions 330 and 332 can be checked by the developer of the extension or the original configuration.

A number of different uses for extension are possible. For example, a security provider can use extensions to change the security for the portal or console. Current pages in the portal or console for policy and role definitions and user and group management can be replaced. Tabs can be added or replaced for specific pages where security related information may be important. Additional management pages can be added as necessary.

Another, example of the use of extensions is for re-branding. For example, a user can modify Look and Feel of a portal or console to maintain a color scheme; promote corporate identity by adding icons, logos and other elements; integrate the portal or console into a tool select menu so that users can navigate to the portal or console from other development tools. The help information can be modified to have the same style of other help information.

EXTENSIBILITY EXAMPLE

An extensibility example is given below. In one embodiment, the portal or console is composed of extensions that enable functionality and features to be plugged in and/or removed easily. In one example, the extensibility framework can support:
 1. Extending portal artifacts (Books, Pages, Menus, Look & Feels): The portal or console can be extended without changing the original configuration of the portal. This allows owners of an extended portal or console to upgrade the console application after an update and not lose their extended console configuration.
    A single extension can expose itself in an arbitrary number of locations in the console, irrespective of level exposed (i.e. Book A, Page B, etc.)
    A single extension can describe modifications to a book, page, menu, Look and Feel or any combination of those.
    The console portal need not explicitly name every extension point since those may not be known up front.
 2. The Extension Lifecycle: Extensions can share session information with the rest of the application.
 3. Extension Installation: The portal or console can have ability to register and deregister an extension, exploiting a registry that shows all extensions. The registry can have some simple authoring information as well.
    The Extension Registry can be the single source for registered extensions for the current portal only.
 4. Extension Packaging/Deployment:
    The portal (console) can have the ability to package an extension, along with its Portal meta-data and deploy this into the portal environment using the installation mechanism described above.
    The installation mechanism need not require customers or Intergrated Software Vendors (ISVS) to break open the portal (Console) application's archive (likely a ear).
    A user can seamlessly navigate between extensions.
    Extensions can participate in a single-sign on scenario.
    In one embodiment, extension definitions must survive Portal and Console upgrades.

Authoring an Extension (Page or Book)
 1. Create the resources that the extension utilizes. These resources are webapp resources and include the following: JSP's, HTML files, Java Classes, Jar libraries, .portlet and .pinc files, and a web.xml snippet. These resources can be authored using WLW or any other editor.
2. Create the portal extension file. This file can be called portal-extension.xml. This file will define where in the console the portal include (pinc) files are to be inserted.
3. Archive up the resources and portal extension file into a jar file.

Create the Extension Resources

The resources that make up the extension can be any web app resource. In order to avoid resource collision with other extensions the JSP's and HTML pages can reside in a unique directory named after the extension provider. For example, if Vignette wants to write an extension, they would put all their files in directory called "vignette". In one example, no extention files are put in the web app's root directory.

Below is an example of an extension that has two portlets, a pinc file, some java classes, and a third party library:

```
vignette/portlet1/portlet1.portlet
vignette/portlet1/portlet1.jsp
vignette/portlet2/portlet2.portlet
vignette/portlet1portlet2.jsp
vignette/newpage.pinc
vignette/portal-extension.xml
META-INF/classes/com/vignette/SomeClass.class
META-INF/lib/thirdparty.jar
```

Create the Portal Extension File

The portal extensions file defines how the extension will modify the console. Here the vignette extension simply inserts a pinc file into the main portal. The pinc file happens to be a page that includes two portlets.

```
<portal-extension>
    <portal-extension-point name="Vignette Extension" description="">
        <portal>console/consol.portal</portal>
            <definition-location definitionLabel="book1" action="right"/>
            <include>vignette/newpage.pinc</include>
    </portal-extension-point>
</portal-extension>
```

The above extension definition informs the portal to install a new 'vignette/newpage.pinc' file to the 'right' of book 'book1' in potal 'console/console.portal'

Jar Up the Resources

Jar up or zip up all the resource files relative to the webapp directory. The name of the jar file can be the same name as the subdirectory in which all the extension files live. For example, the jar for associated with the previous section's example would be called vignette.jar.

Portal Extension Point Schema

The portal extension file accepts many different options. This section attempts to describe all the options available to the extension writer when developing a portal extension point.

A portal extension file can contain one or more <portal-extension-point> elements.

A <portal-extension-point> element can have a 'name' attribute and an optional description attribute.

The <portal-extension-point> element can contain a child <portal> element. The <portal> element's content contains the path name of the portal the extension will modify. The path name is relative to the top of the webapp.

The <portal> element cab be followed by one of the following elements <definition-location> or <meta-location> element.

The <definition-location> element can define a location in the portal where the extension will modify, by specifying the definition label of a book or page in the portal. All pages and books can have definition labels. The definition label also has an 'action' attribute. The action attribute can take on one of the following values:

left—install the extension to the left of the book or page defined by the definition label.

right—install the extension to the left or right of the book or page defined by the definition label remove—remove the page or book defined by the definition label.

replace—replace the book or page defined by the definition label.

The <meta-location> element can be used in place of the <definition-location> element. In order to use the <meta-location> element the pages and books contain meta tags. Meta tags are described below. The <meta-location> element supports the 'action' attribute as defined under the <definition-location> element and has the same effect. The <meta-location> element supports a child <meta-data> element. The <meta-data> element identifies the location or locations for the extension modification point. The <meta-data> element cab take on the following attributes:

name—the name of the meta element (example 'keyword')

content—the value of the meta element. This element can take on multiple values by separating them with a ';' or you may specify the separator with the 'separator' attribute.

limit—the number of locations to effect. 0-n. If zero is supplied then all locations matching the meta data will be effected, If one is supplied then only the first location is modified. If two is supplied then the first two locations are modified, and so on . . .

condition—can take on one two values "any" and "all". If any is supplied then the location will match if_any_of the supplied meta values matched. If all is supplied then_all_the meta values must match.

separator—the separator to use for multi valued content. The default separator is the semi colon.

An example of using the meta-location element follows:

```
<meta-location action="remove">
    <meta name="keword" content="security" limit="0" condition="any"/>
</meta-location>
```

This location description would make modifications to all books and pages that have a meta tag with the keyword "security."

A <portal-extension-point> may also contain an <include> element. The <include> element can only be omitted when the action on the location element is "remove." The <include> element identifies the location of the 'pinc' file relative to the top of the web app.

Installing the Extension

The following steps are describe an example of installing an:
1. Drop the extension jar into an install directory.
2. Redeploy the portal (console).

If more than one extension exists, you may modify/create a portal-extensions.xml file that defines the order in which the extensions are loaded. The order of load defines the precedence for any collisions that might occur.

Collisions can potentially occur with java classes and third party libraries. The first extension to load the java class or library determines which class gets loaded.

An example of a portal-extensions.xml file follows:

```
<portal-extensions>
    <portal-extension>
        <extension-jar>vignette.jar</extension-jar>
        <load-on-startup>1</load-on-startup>
    </portal-extension>
    <portal-extension>
        <extension-jar>magellan.jar</extension-jar>
        <load-on-startup>1</load-on-startup>
    </portal-extension>
<portal-extensions>
```

Meta Data Tags

The portal (console) can have the ability to address an extension or part of an extension to facilitate interoperability between extensions written by ISV's, etc. It can also have the ability within its own operation to address an extension or part of an extension to locate a particular page.

To this end, the portal (console) can have the ability to add properties (meta-data) to high-level portal tags.

The following should be allowed:

Ability to tag high-level portal controls (tags), including tags in ancillary portal files such as pinc files.

Can allow multiple Name Value pairs. Each name may correspond to multiple values.

Ability to query this meta-data and have a backing context returned then it is up to the developer to do what they want, all required information should be available in the backing context.

APIs can be available for querying the meta-data. These APIs should be available to the backing context.

An administration console can provide a change list comprised of attribute changes, MBean creates and the like. The console can to be able to link from individually listed entries in the change list to the console page for manipulating it. For example, a user has made a change and realized the incorrect value was entered, but has not been committed. The user can click on the entry in the change list and which results in a query. As a result of the query, a bit of meta-data is passed w/regards to the kind of page they want to navigate to.

Meta tags can follow the same paradigm as the HTML meta tag. Meta tags may be added to Desktops, Books, Pages and Portlets. Meta tags serve as a mechanism to tag an object with keywords or search criteria so the object may be located via API or portal extension point. Meta data may be used to provide information to a Web Services for Remote Portlets (WSRP) registry. Meta tags should not to be confused with Portlet Preferences. Preferences are more about business data that the portlet uses to help the portlet perform its function. Examples of preference data: hostname=127.58.43.11, port=8000, stock=BEAS, . . . While examples of meta data may be: keyword=security, vertical=financial.

Control Schema Modifications

The schema for desktops, book, pages and portlets elements can be updated to allow one or more meta elements. The new meta tags must immediately follow the <netuix:desktop>, <netuix:book>, <netuix:page> or <netuix:portlet> tag, it may not be located in the <netuix:content> element.

```
Example:
<netuix:book title="my Book" definitionLabel="book_1">
    <netuix:meta name="keyword" contents="security"/>
    <netuix:meta name="author" contents="Dan Marino"/>
    <netuix:singleLevelMenu/>
    <netuix:content>
        ...
    </netuix:content>
</netuix:book>
```

Metadata Schema

In one embodiment, metadata tags will take on the following form: <netuix:meta name="keyword" contents="security;roles" separator=";"/>

Like other netuix controls, the meta tag can have the 'netuix' xml namespace prefix. All meta tags will support the following attributes"

name—The is a required field and can take on any user defined value or can be one of the built in names.

contents—This is a required fields and contains the values for the metadata. Meta data can be multi-valued or single-valued. Multi-valued data is separated by the separator character separator—An optional separator used to delineate multi valued metadata. The default value is the semicolon.

New Metadata-Aware API

In order to take advantage of the new meta tags a new set of API and objects will be added to the portal framework API to allow for locating objects with the supplied meta data.

New Backable Controls

Currently only Books, Pages and Portlets are 'backable'. A backable control allows the developer to add a backing file (java class) to the control. A developer uses this class to interact with the controls and participate in the lifecycle of the parent control. Also, backable controls have 'backing context' A backing context is a java class that represents the underlying control and has methods on it that allow the developer to interface with the control.

Under this specification the following controls will be added to the list of backable controls Desktop, Header, Footer, Tree, and Menu Along with the basic API for interfacing with the controls a new set will be added to use the meta data to discover other child controls.

The DesktopBackingContext will have the following new methods

```
/**
 * Retrieve the main book (top level) backing context.
 * @return a reference to the main book backing context otherwise null if
 none exist.
 */
public BookBackingContext getBookBackingContext( );
/**
 * Return a book searching the entire tree recursively.
 * If you are interested in both books AND pages use
 * getPageBackingContextRecursive( ) as that method returns both.
```

-continued

```
 * @param definitionLabel of the book
 * @return the Book of interest or null if not found.
 */
public BookBackingContext getBookBackingContextRecursive(String
definitionLabel);
/**
 * Return a set of books matching the supplied meta data search criteria.
 * This method will search the entire tree looking for books with matching
 * meta data and only stopping when the 'limit' is reached. Meta data can
 * be added to books by inserting <netuix:meta/>; tags into the body of
 * the main book element.
 * If you are interested in both books AND pages use
 * getPageBackingContextsByMeta( ) as that method returns both.
 * @param metaData contains the search criteria
 * @param limit maximum number of items to return:
 * 0 == no limit, 1 == first match , n = first n matches
 * @return a non null array of matching book backing contexts.
 */
public BookBackingContext[ ]
getBookBackingContextsByMeta(MetaData[ ] metaData,
                                              int limit);
/**
 * Return a set of pages and books (books extend pages) matching the
 * supplied meta data search criteria. This method will search the entire
 * tree looking for pages and books with matching meta data and only
 * stopping when the supplied limit is reached. Meta data can be added to
 * pages by inserting <netuix:meta/> tags into the body of the main page
 * element. @param metaData contains the search criteria
 * @param limit maximum number of items to return:
 * 0 == no limit, 1 == first match , n = first n matches
 * @return a non null array of matching page backing contexts.
 */
public PageBackingContext[ ]
getPageBackingContextsByMeta(MetaData[ ] metaData,
                                              int limit)
/**
 * Return a set of portlets matching the supplied meta data search criteria.
 * This method will search the entire tree looking for portlets and books
 * with matching meta data and only stopping when the supplied limit is
 * reached. Meta data can be added to portlets by inserting <netuix:meta/>
 * tags into the body of the main portlet element.
 * @param metaData contains the search criteria
 * @param limit maximum number of items to return:
 * 0 == no limit, 1 == first match , n = first n matches
 * @return a non null array of matching portlet backing contexts.
 */
public PortletBackingContext[ ]
getPortletBackingContextsByMeta(MetaData[ ] metaData,
                                              int limit)
/**
 * Return a book or a page but traverse the entire tree,
 * this will go inside books that are on pages too.
 * @param definitionLabel
 * @return pageBackingContext or (BookBackingContext if book) of the
 * page or book with matching definition label.
 */
public PageBackingContext getPageBackingContextRecursive(String
definitionLabel);
/**
 * Return the portlet backing context matching the supplied instance label.
 * @param instanceLabel unique instance label of the portlet
 * @return a reference to the portlet's BackingContext if it exist otherwise
null.
 */
public PortletBackingContext getPortletBackingContextRecursive(String
instanceLabel);
/**
 * Return the portlet backing contexts matching the supplied definition
 * label. Since many portlets can share the same definition label, more
 * then one portlet can be returned
 * @param definitionLabel label of the portlet
 * @return a non null array of PortletBackingContext.
 */
public         PortletBackingContext
getPortletBackingContextByDefinitionLabel(String
definitionLabel)
/**
 * Return a reference to the Header backing context if one exists.
 * @return a reference to the Header if one exists in the shell otherwise
null.
 */
public HeaderBackingContext getHeaderBackingContextRecursive( )
/**
 * Return a reference to the Footer backing context if one exists.
 * @return a reference to the Footer if one exists in the shell otherwise
null.
 */
public FooterBackingContext getFooterBackingContextRecursive( )
/**
 * Return a reference to the Tree backing context if one exists.
 * @return a reference to the Tree if one exists in the shell otherwise null.
 */
public TreeBackingContext getTreeBackingContextRecursive( )
```

BackingContexts for Books and Pages will get similar methods. Suppose the developer wanted to activate a page that has the following meta tags:

```
<netuix:page title="Role Updates" definitionLabel="page_role1" />
    <netuix:meta name="keyword" contents="security;roles;update"/>
```

The developer could implement the following method on the main desktop or main book's backing file.

```
public boolean handlePostbackData(HttpServletRequest request,
HttpServletResponse response)
{
   DesktopBackingContext desktop =
   DesktopBackingContext.getDesktopBackingContext(request);
   MetaData[ ] metaData = {new MetaData(MetaData.KEYWORDS,
   "security;roles", MetaData.ANY)};
   PageBackingContext[ ] pages =
   desktop.getPageBackingContextsByMeta(metaData, 1);
   if (pages.length > 0)
   {
      PageBackingContext page = pages[0];
      page.setupPagechangeEvent(page.getDefinitionLabel( ));
   }
   return true;
}
```

The MetaData class allows for more sophisticated searching. In our example many MetaData objects could have been supplied and you can choose to match all or any of the search criteria on each of the MetaData objects. The developer can also specify a limit for the maximum number of results to return.

Portlet Preferences Service Provider Interface (SPI)

The portal or console can use means for persisting preferences. The following should be handled:

An SPI interface so the console does not become bound to a persistence mechanism
A means to associate a preference on a global basis
A means to associate a preference on a per-user basis
An API for working with the preferences
A console user can store preferences for a particular table of information in the WLS console. A table can be sorted, and specific columns selected for display, this configuration can be stored as a preference for that table, so that when the user revisits the table, it's presented in the same fashion.

The Portlet Preference SPI can support JSR 168 and not impact to current customers. The Out of the Box (OOTB) default implementation will be the current portal framework solution where preferences get persisted in the database. The default implementation may be changed by updating the netuix-config.xml file. The portlet developer will also be able to dynamically change the implementation class via a set of API.

Registering a Portlet Preferences Implementation

Portlet Preference Implementations can be registered in the netuix-config.xml file. A new section will be added and will look as follows:

```
<portlet-preference-providers>
    <default-provider>portalFramework</default-provider>
    <portlet-preference-provider>
        <provider-name>portalFramework</provider-name>
        <provider-class>
            com.bea.portlet.prefs.provider.
            RDBMSPreferenceProviderImpl
        </provider-class>
    </portlet-pfsreference-provider>
    <portlet-preference-provider>
        <provider-name>console</provider-name>
        <provider-class>
            com.bea.preference.provider.
            FilePreferenceProviderImpl
        </provider-class>
    </portlet-preference-provider>
</portlet-preference-providers>
```

Implementing the Portlet Preference SPI

Preference Provider implementations can implement the following interface: com.bea.portlet.prefs.IPreferenceStore. IPreferenceStore has the following methods

```
/**
 * Returns preferences for the given uniqueId. The
 * returned java.util.Map contains names of values of
 * preferences, and may be empty if there are no preferences for
 * the given unique identifier.
 *
 * @param uniqueId - portlet instance Id or instance label, also other
 * information like Principal may be supplied in the id.
 * @return map of the name value pairs.
 * @throws PreferenceStoreException if there was an error retrieving all
 * or some of the preferences.
 */
public Map getPreferences(PortletPreferencesId uniqueId)
        throws PreferenceStoreException;
/**
 * Returns preferences for the given uniqueId. The
 * returned java.util.Map contains names of values of
 * preferences.
 *
 * This method returns the defaults if there are no preferences
 * for the given unique identifier.
 *
 * If the defaults contain additional preferences, this method
 * merges the defaults (cloned) with the entity preferences.
 *
 * @param uniqueId - portlet instance Id or instance label, also other
 * information like Principal may be supplied in the id.
 * @return map
 * @throws PreferenceStoreException if there was an error retrieving all
 * or some of the preferences.
 */
public Map getPreferences(PortletPreferencesId uniqueId, final Map defaults)
        throws PreferenceStoreException;;
/**
 * Writes the preferences to the underlying persistence
 * store.
 * @param uniqueId - portlet instance Id or instance label, also other
 * information like Principal may be supplied in the id.
 * @param preferences preferences
 * @throws PreferenceStoreException if there was an error retrieveing all
 * or some of the preferences.
 */
public void store(final PortletPreferencesId uniqueId, Map preferences)
        throws PreferenceStoreException;
/**
 * Remove a list of preferences for this unique id.
 * @param uniqueId - portlet instance Id or instance label, also other
 * information like Principal may be supplied in the id.
 * @param preferenceNames a list preference names to remove.
 * @throws PreferenceStoreException if there was an error retrieving all
 * or some of the preferences.
 */
public void remove(final PortletPreferencesId uniqueId, List preferenceNames)
        throws PreferenceStoreException;
/**
 * Remove a all preferences for this unique id.
 * @param uniqueId - portlet instance Id or instance label, also other
 * information like Principal may be supplied in the id.
 * @throws PreferenceStoreException if there was an error retrieving all
 * or some of the preferences.
 */
public void remove(final PortletPreferencesId uniqueId)
        throws PreferenceStoreException;
```

The PortletPreferenceId class can contains the portletInstanceId or the instanceLabel of the portlet to which the preferences apply. The PortletPreferenceId may can contain an optional java Principal to scope the preference to a particular user.

Specifying the Preference Provider

The portlet backing context and presentation context can be updated with the following methods to dynamically get and set the preference provider on the fly:

```
public String getPreferenceProvider( );
/**
 * Set the preference provider for this portlet. This only lasts the life of
 * the request. So the preference provider must be set for every request.
 * The default provider can be changed by updating the netuix-config.xml
 * file. @param name the name of the preference provider as defined
 * in the netuix-config.xml file
 */
public String setPreferenceProvider(String name);
```

Ultimately, all these methods do is update the HttpRequest attribute com.bea.portlet.prefes.IPreferenceStore to the name of the provider. This attribute will be cleared for the next portlet and reset for another lifecycle method. It is recommended that the context API used, however, the JSR 168 portlets have no access to this API and with changing the javax implementation they need a way to set the provider.

Light Portal Framework.

The Light Portal framework provides the services necessary for rendering a configurable user-interface. The Light Portal framework will add an extensible nature to the console, enabling customers to add functionality in the form of console extensions. Using the same grammar as the console, an extension developer will describe their applications major user-interface elements, as well as the location(s) in the console that they wish to surface their extension.

In one embodiment, the system administration console uses the Struts MVC framework which provides the necessary components for assembling our application. The Struts frameworks uses the concepts of loosely coupled actions configured via an XML based configuration. The model to the view using Java Beans In one embodiment, the system administration console uses a combination of templates that enable fluid page construction and reuse. Pages will be based on a core set of templates that will be reused throughout the console. These same templates can be used by Console Extension Developers to produce pages. This will improve readability, debugging and maintainability of these pages.

In one embodiment, the system administration console can validate all user input not only for semantic meaning but lexical meaning as well. This validation will occur both on the user and server side.

In one embodiment, the system adminsistration console can use logging to facilitate reporting of exceptions that occur during usage of the console. We are attempting to provide a flexible logging mechanism that doesn't tie a console user into a specific logging implementation. But at the same time not overlap with the OA&M logging facilities.

In one embodiment, the system administration console can use tree functions that take on more of a task-oriented theme, and options available in previous releases of the console will be incorporated into the application pages The Light Portal Framework is a version of WebLogic Portal which contains the core functionality of portal w/o the weight of additional features like Content Management and Personalization. It also does not include the management features and tools that the full portal product has. The following description outlines what Light Portal looks like feature wise in one embodiment:

Portlets (JSP (with or without backing files), pageflows, Struts, JSR168, WSRP)

Pages, Menus and Books (aggregate pages and other books)

Look and Feels

Themes (Nested Look and Feels)

Layouts

Entitlements—fully functional but without the database to persistently store them, or the tools to create them.

No database required

No EJB's required

What's not included is:

Customization

Content management

Commerce components

Admin Tools

Full portlet preferences support

The Light Portal framework can be configured by making an entry in the web.xml of the application that wishes to use it for its PortalServlet. Additional libraries are then added to the WEB-INF/lib directories to support use of the PortalServlet and other Light Portal infrastructure code.

Enhancements to Light Portal Framework

In order to support the extensibility requirements for the console, the features of a portal product are enhansed. These enhancements include:

The notion of extending a page, book, or menu without changing the original configuration of the portal The notion of registering and deregistering an extension and a registry The notion of describing an extension, and that extension describing its extension point in the console.

The notion of tagging a portal artifact (book, page) with arbitrary bits of meta-data.

A console extension can appear and interact seamlessly with other console extensions. To facilitate this, a user must be able to log in once to the console and access various console extensions without being prompted to sign in again. To this end, no matter if a console extension is packaged and deployed as a separate application, it must participate in a single sign-on scenario.

A console extensions functionality can be reused in a couple of ways, an extension developer can directly extend it, or it can invoke it from within another application. An external application must then be able to invoked a named console extension. A external tool should be able to accomplish this without any specific resource information other than the name of the extension, and perhaps some information it wants to pass to the extension.

The Struts framework is the de-facto standard implementation of the MVC pattern which defines clear separations between different tiers of an application. Those tiers being the Model, the View and the Controller. This framework gives us a clear way of segmenting the console. This section describes the various Struts components that can be used in the console application to put them in the context of how they will be used by our application.

Figure 4:
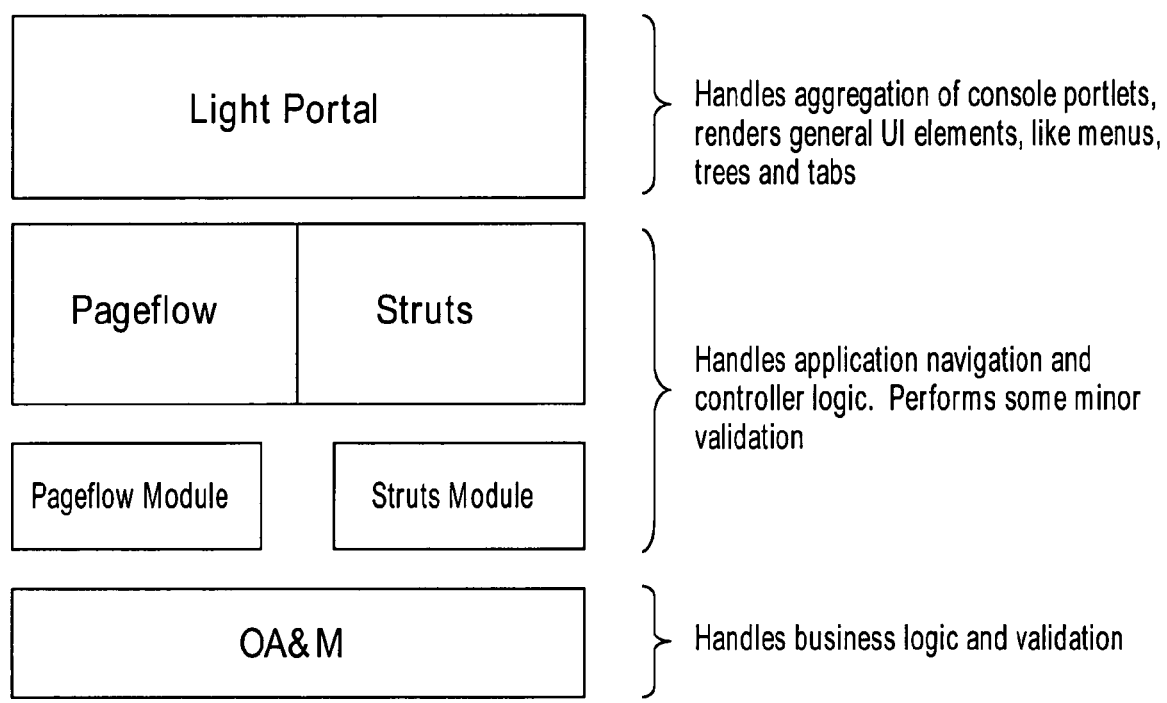
FIG. 4 illustrates the architecture of a administrative console in one embodiment of the present inventions.
Figure 5:
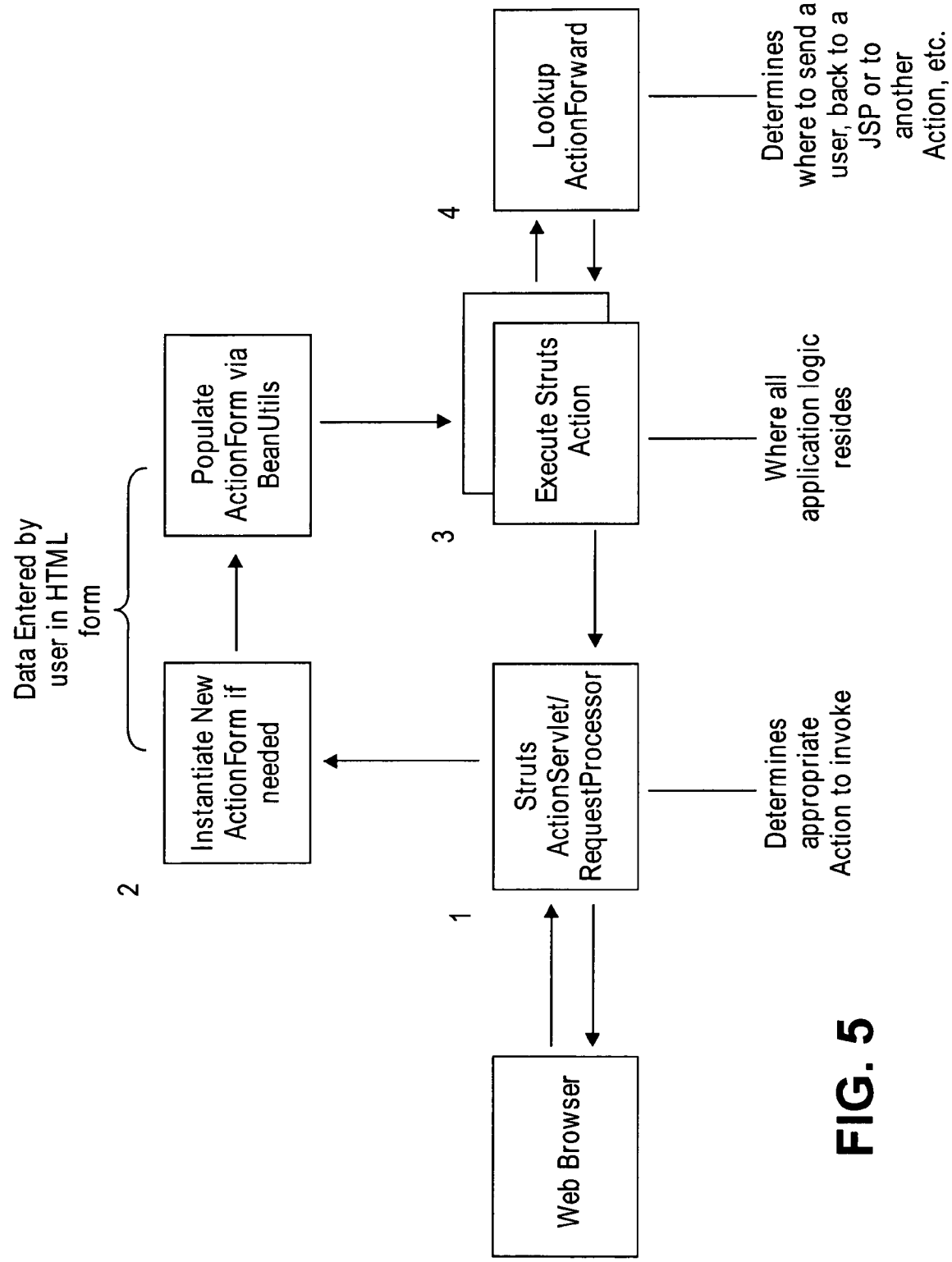
FIG. 5 is a diagram that illustrates the operation of a web console of the system of FIG. 4.

FIG. 4 illustrates our a console architecture at a high-level and where the basic Struts primitives fall into place for a typical request. FIG. 5 is a diagram that illustrates the operation of a web console of the system of FIG. 4.

The console application itself is described in a configuration file that is used by Struts to initialize the various components like Actions and Form Beans. The configurations that represent the console application will be broken into modular pieces that deal with a broader area of functionality. For example, a configuration module, a security module. This type of segmentation is commonly referred to as "sub-modules" in Struts.

A Struts configuration is represented persistently as an XML document and a DTD is provided for validation of the configuration. The Struts framework defines the schema for the configuration, and some extension points to it as well.

The Struts configuration is comprised of a number of elements that describe the different components of an application, the major ones are described here:

<action> This element describes a Struts action, which acts as a controller in the application. Actions are identified via a path attribute, the client specifies this path to access this action.

<forward> This element is used with the <action> element to describe a location can be navigated to after an action has finished processing. These are named such that an action has no knowledge of the path or actual destination. Note, there are another class of forwards known as global forwards, these forwards can be used by any action in a Struts module. They are specified using the same <forward> element, but are children of a <global-forwards> parent in this case.

<form-bean> This element describes a Struts form bean. The form bean is a Java Bean representation of an HTML form. These can be mapped to one or more Struts actions.

Action classes are where the controller logic in our application resides. The actions are classes that are invoked during execution to perform interesting operations against the data such as passing information from an HTML form to the controller, as well as populating view based classes for rendering in the client. Action classes are referenced via a URL specified in the Struts configuration. An action can also catch exceptions and populate error collections for presentation back to the client. An action does not contain business logic.

One embodiment of the present invention may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROM's, EEPROM's, DRAM's, flash memory devices, magnetic or optical cards, Nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A computer system comprising at least one processor and at least one memory that can be used to implement at least one portal, the system further comprising:
   an original configuration to form an original portal, the original configuration including resources and a portal file identifying the resources;
   a plurality of extensions to collectively form an extended portal without changing the original configuration; and
   a registry or file that specifies the order in which the plurality extensions are loaded;
   wherein the extended portal is formed using both the original configuration and the plurality of extensions, and using the registry or file that specifies the order in which the plurality extensions are loaded;
   wherein the order in which the plurality of extensions are loaded defines a precedence for any collisions that might occur;
   wherein the original configuration is stored separately from the plurality of extensions and separately accessed to form the extended portal;
   wherein a modification to the original configuration will result in a corresponding modification to both the original portal and the extended portal, but will not result in a modification to the extensions; and
   wherein a modification to one or more of the extensions will result in a corresponding modification to the extended portal, but will not result in a modification to the original configuration and the original portal.

2. The computer system of claim 1, wherein the registry or file shows all extensions for the extended portal.

3. The computer system of claim 1, wherein a single sign-in process can be done for accessing both the original portal derived from only the original configuration and the extended portal derived from the original portal and the plurality of extensions.

4. The computer system of claim 1, wherein the original configuration is stored in an archive file.

5. The computer system of claim 1, wherein the extensions do not change the contents of the archive file.

6. The computer system of claim 1, wherein the extended portal is a system administration console.

7. The computer system of claim 1, wherein the extended portal is constructed with a portal product.

8. The computer system of claim 1, wherein each of at least two of the extensions includes a portal extension file and extension resources, and wherein each of at least two of the extensions describes one or more modifications to at least two portal artifacts selected from the group consisting of:
   a book;
   a page;
   a menu; and
   look and feel.

9. A method comprising:
   separately storing an original configuration and a plurality of extensions, the original configuration useable to form an original portal, and the original configuration including resources and a portal file identifying the resources;
   forming an extended portal by separately accessing the original configuration and the plurality of extensions without changing the original configuration, including loading the plurality of extensions in a specified order; and
   accepting one or more modifications to the original configuration or one or more of the extensions;
   wherein the order in which the plurality of extensions are loaded defines a precedence for any collisions that might occur:
   wherein a modification to the original configuration will result in a corresponding modification to both the original portal and the extended portal, but will not result in a modification to the plurality of extensions; and
   wherein a modification to one or more of the extensions will result in a corresponding modification to the extended portal, but will not result in a modification to the original configuration and the original portal.

10. The method of claim 9, wherein the registry or file shows all extensions for the extended portal.

11. The method of claim 9, wherein a single sign-in process can be done for accessing both the original portal derived from only the original configuration and the extended portal derived from the original portal and the plurality of extensions.

12. method of claim 9, wherein the original configuration is stored in an archive file.

13. The method of claim 12, wherein the extensions do not change the contents of the archive file.

14. The method of claim 9, wherein the extended portal is a system administration console.

15. The method of claim 9, wherein the extended portal is constructed with a portal product.

16. The method of claim 9, wherein each of at least two of the extensions includes a portal extension file and extension resources, and wherein each of at least two of the extensions describes one or more modifications to at least two portal artifacts selected from the group consisting of:
   a book
   a page;
   a menu; and
   look and feel.

17. method of claim 16, wherein the portal extension file indicates the insertion of an extension resource into the portal.

18. A computer readable storage medium including code to do the steps of:
   forming an extended portal by separately accessing an original configuration and a plurality of extensions without changing the original configuration, the forming including loading the plurality extensions in a specified order, the original configuration including resources and a portal file identifying the resources; and
   accepting one or more modifications to the original configuration or one or more of the extensions;
   wherein the order in which the plurality of extensions are loaded defines a precedence for any collisions that might occur;
   wherein a modification to the original configuration will result in a corresponding modification to both the original portal and the extended portal, but will not result in a modification to the plurality of extensions; and
   wherein a modification to one or more of the extensions will result in a corresponding modification to the extended portal, but will not result in a modification to the original configuration and the original portal.

19. A computer system comprising at least one processor and at least one memory that can be used to implement at least one portal, the system further comprising:
   an original configuration including resources and a portal file identifying the resources, the original configuration useful to form an original portal; and
   a first extended portal formed using both the original configuration and a first plurality of extensions, without changing the original configuration;
   a second extended portal formed using both the original configuration and a second plurality of extensions without changing the original configuration;
   a first registry or file that specifies the order in which the first plurality extensions are loaded, wherein the order in which the first plurality of extensions are loaded defines a precedence for any collisions that might occur resulting from the first plurality of extensions;
   a second registry or file that specifies the order in which the second plurality extensions are loaded, wherein the order in which the second plurality of extensions are loaded defines a precedence for any collisions that might occur resulting from the second plurality of extensions;
   wherein the original configuration is stored separately from the first plurality of extensions and separately accessed to form the first extended portal;
   wherein the original configuration is stored separately from the second plurality of extensions and separately accessed to form the second extended portal;
   wherein a modification to the original configuration will result in a corresponding modification to the first extended portal and the second extended portal, but will not result in a modification to the first plurality of extensions, and will not result in a modification to the second plurality of extensions; and
   wherein a modification to one or more extensions of the first plurality of extensions will result in a corresponding modification to the first extended portal but will not result in a modification to the original configuration, and will not result in a modification to the second extended portal; and
   wherein a modification to one or more extensions of the second plurality of extensions will result in a corresponding modification to the second extended portal but will not result in a modification to the original configuration, and will not result in a modification to the first extended portal.

* * * * *

UNITED STATES PATENT AND TRADEMARK OFFICE
CERTIFICATE OF CORRECTION

PATENT NO. : 7,526,537 B2  Page 1 of 1
APPLICATION NO. : 11/132033
DATED : April 28, 2009
INVENTOR(S) : Breeden et al.

It is certified that error appears in the above-identified patent and that said Letters Patent is hereby corrected as shown below:

In Claim 9, at Column 16, Line 53, replace ":" with --;--;

In Claim 16, at Column 17, Line 17, after "book" insert --;--.

Signed and Sealed this

Fourth Day of August, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,526,537 B2
APPLICATION NO. : 11/132033
DATED : April 28, 2009
INVENTOR(S) : Timothy Breeden et al.

It is certified that error appears in the above-identified patent and that said Letters Patent is hereby corrected as shown below:

In column 3, line 25, delete "implemneted" and insert -- implemented --, therefor.

In column 4, line 56, delete "Intergrated" and insert -- Integrated --, therefor.

In column 4, line 56, delete "(ISVS)" and insert -- (ISVs) --, therefor.

In column 5, lines 16-17, delete "extention" and insert -- extension --, therefor.

In column 5, line 48, delete "potal" and insert -- portal --, therefor.

In column 5, line 48, after "portal" insert -- . --.

In column 6, line 17, after "label" insert -- . --.

In column 6, line 56, delete "keword" and insert -- keyword --, therefor.

In column 8, line 25, after "attributes" insert -- . --.

In column 8, line 31, after "character" insert -- . --.

In column 11, line 58, delete "retrieveing" and insert -- retrieving --, therefor.

In column 12, line 3, delete "retrieveing" and insert -- retrieving --, therefor.

In column 13, line 3, after "Beans" insert -- . --.

In column 13, line 15, delete "adminsistration" and insert -- administration --, therefor.

In column 13, line 24, after "pages" insert -- . --.

In column 13, line 52, delete "PortalServiet." and insert -- PortalServlet. --, therefor.

Signed and Sealed this

First Day of June, 2010

David J. Kappos
*Director of the United States Patent and Trademark Office*

CERTIFICATE OF CORRECTION (continued)
U.S. Pat. No. 7,526,537 B2

In column 13, line 58, delete "enhansed." and insert -- enhanced. --, therefor.

In column 13, line 61, after "portal" insert -- . --.

In column 13, line 63, after "registry" insert -- . --.

In column 16, line 55, in claim 9, delete "occur:" and insert -- occur; --, therefor.

In column 17, line 4, in claim 12, delete "method" and insert -- The method --, therefor.

In column 17, line 17, in claim 16, delete "a book" and insert -- a book; --, therefor.

In column 17, line 21, in claim 17, delete "method" and insert -- The method --, therefor.

In column 18, line 8, in claim 19, delete "extensions" and insert -- extensions, --, therefor.